United States Patent
Campbell

(10) Patent No.: US 9,636,269 B2
(45) Date of Patent: May 2, 2017

(54) PACKAGING SHEETS AND PACKAGING MATERIALS

(71) Applicant: Automated Solutions, LLC, Sawmills, NC (US)

(72) Inventor: Robert L. Campbell, Hickory, NC (US)

(73) Assignee: AUTOMATED SOLUTIONS, LLC, Sawmills, NC (US)

(*) Notice: Subject to any disclaimer, the term of this patent is extended or adjusted under 35 U.S.C. 154(b) by 0 days.

(21) Appl. No.: 14/459,241

(22) Filed: Aug. 13, 2014

(65) Prior Publication Data

US 2015/0182407 A1   Jul. 2, 2015

Related U.S. Application Data

(60) Provisional application No. 61/865,570, filed on Aug. 13, 2013.

(51) Int. Cl.
*A61G 17/06* (2006.01)
*B32B 27/08* (2006.01)
(Continued)

(52) U.S. Cl.
CPC ........... *A61G 17/06* (2013.01); *A61G 17/007* (2013.01); *B32B 7/12* (2013.01); *B32B 15/08* (2013.01); *B32B 15/085* (2013.01); *B32B 15/088* (2013.01); *B32B 15/09* (2013.01); *B32B 27/08* (2013.01); *B32B 27/12* (2013.01); *B32B 27/32* (2013.01); *B32B 27/34* (2013.01); *B32B 27/36* (2013.01); *B32B 37/203* (2013.01); *B65D 65/40* (2013.01); *B65D 75/20* (2013.01);
(Continued)

(58) Field of Classification Search
CPC ........ A61G 17/007; A61G 17/06; B32B 7/12; B32B 27/12; B32B 27/08; B32B 27/32; B32B 27/34; B32B 27/36; B32B 27/223; B32B 2439/00; B32B 2439/46; B32B 2405/00; B32B 2255/10; B32B 2255/26; B32B 15/08; B32B 15/085; B32B 15/088; B32B 15/09; B32B 37/1284; B32B 37/203; B32B 37/223; B32B 2439/06; B32B 2439/80; B65D 75/20; B65D 75/26; B65D 75/28; B65D 75/30; B65D 65/40; Y10T 428/14; Y10T 428/1471; Y10T 428/1476
See application file for complete search history.

(56) References Cited

U.S. PATENT DOCUMENTS 2,529,060 A * 11/1950 Trillich ................ B65D 65/40
                                                       206/819
3,556,894 A *  1/1971 Bernard .................... B44C 1/17
                                                       156/235
(Continued)

*Primary Examiner* — Patricia L Nordmeyer
(74) *Attorney, Agent, or Firm* — J. Bennett Mullinax, LLC

(57) ABSTRACT

Packaging sheets, packaging material comprise one or more packaging sheets and related methods are provided herein. A packaging sheet can include a first substrate having a first surface and an opposing second surface. An adhesive layer can be applied on the first surface of the first substrate. A cohesive layer can he applied on the adhesive layer, such that the cohesive forms a first outer surface of the packaging sheet with the opposing second surface of the first substrate forming a second outer surface. The packaging sheets can, in some embodiments, comprise body bag sheets used to form body bags.

16 Claims, 14 Drawing Sheets

(51) Int. Cl.

| | | |
|---|---|---|
| *B32B 37/22* | (2006.01) | |
| *B32B 27/34* | (2006.01) | |
| *B32B 27/36* | (2006.01) | |
| *B32B 7/12* | (2006.01) | |
| *B32B 27/32* | (2006.01) | |
| *B32B 37/20* | (2006.01) | |
| *B32B 15/08* | (2006.01) | |
| *B32B 15/085* | (2006.01) | |
| *B32B 15/088* | (2006.01) | |
| *B32B 15/09* | (2006.01) | |
| *B32B 27/12* | (2006.01) | |
| *B65D 65/40* | (2006.01) | |
| *B65D 75/20* | (2006.01) | |
| *B65D 75/26* | (2006.01) | |
| *B65D 75/28* | (2006.01) | |
| *B65D 75/30* | (2006.01) | |
| *A61G 17/007* | (2006.01) | |
| *B32B 37/12* | (2006.01) | |
| *B32B 38/00* | (2006.01) | |
| *B32B 37/24* | (2006.01) | |

(52) U.S. Cl.
CPC .............. *B65D 75/26* (2013.01); *B65D 75/28* (2013.01); *B65D 75/30* (2013.01); *B32B 37/1284* (2013.01); *B32B 38/0008* (2013.01); *B32B 2037/243* (2013.01); *B32B 2255/26* (2013.01); *B32B 2405/00* (2013.01); *B32B 2439/06* (2013.01); *B32B 2439/46* (2013.01); *B32B 2553/00* (2013.01); *Y10T 428/1471* (2015.01); *Y10T 428/1476* (2015.01); *Y10T 428/15* (2015.01); *Y10T 428/2852* (2015.01)

(56) References Cited

U.S. PATENT DOCUMENTS

| | | | | |
|---|---|---|---|---|
| 5,874,155 | A * | 2/1999 | Gehrke | B29C 43/222 383/200 |
| 6,287,658 | B1 * | 9/2001 | Cosentino | B32B 7/06 206/411 |
| 6,463,633 | B1 * | 10/2002 | Sangani | A61F 13/58 24/304 |
| 2002/0110675 | A1 * | 8/2002 | Finestone | B32B 27/08 428/215 |
| 2003/0044558 | A1 * | 3/2003 | Lee | B32B 27/10 428/40.1 |

* cited by examiner

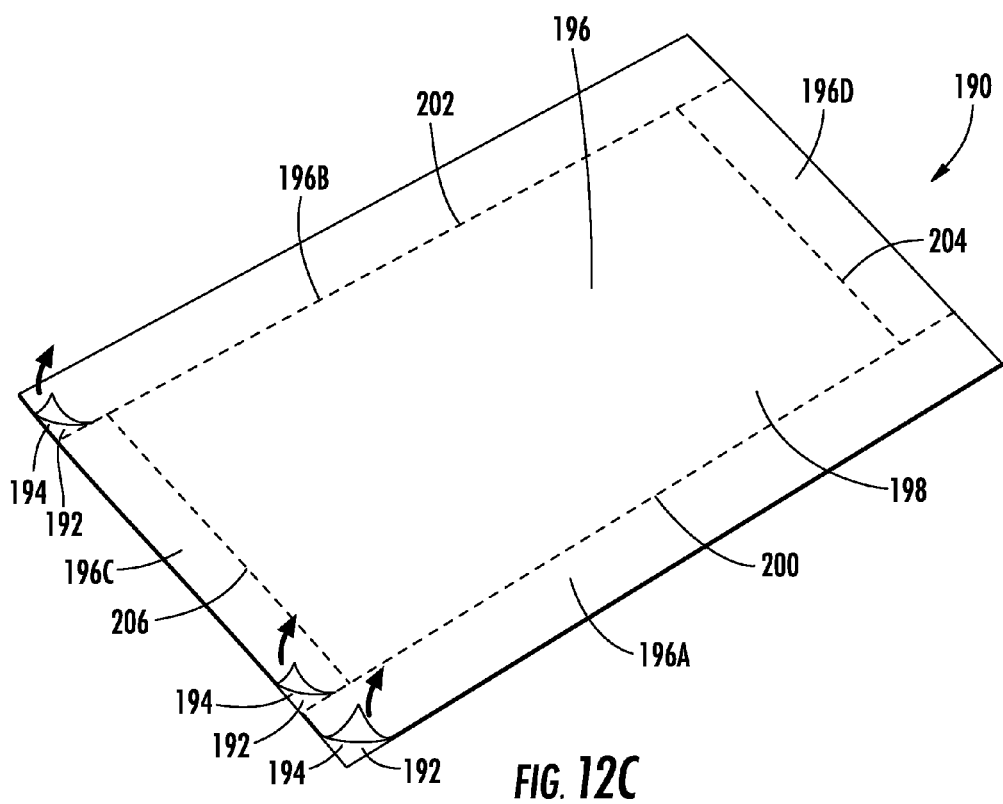

PACKAGING SHEETS AND PACKAGING MATERIALS

RELATED APPLICATIONS

This application claims priority to U.S. Provisional Patent Application Ser. No. 61/865,570, filed Aug. 13, 2013, the entire contents of which is hereby incorporated by reference herein.

TECHNICAL FIELD

The subject matter disclosed herein relates to packaging sheets, packaging materials and related methods of making and using. In particular, the present subject matter relates to packaging sheets and materials that can form a package by sealing a cohesive layer of a sheet to itself or to a cohesive layer of a different sheet and methods related to the packaging sheets and materials.

BACKGROUND

Packaging is the technology of enclosing or protecting items, remains, or products for transport, distribution, storage, sale, and/or use. Packaging material can come in a wide range of structures, sizes and material. One objective of most types of packaging is providing physical protection from hard contact, heat, cold, compression, and other mechanical or electrically shock. Another objective of many types of packaging is providing barrier protection from chemical exposure, oxygen, water vapor, dust, etc. A further objective of most types of packaging is to contain or agglomerate the contents being packaged. For example, small objects are typically grouped together in one package for reasons of efficiency. Additionally, some items such as liquids, powders, and granular materials need containment.

Plastic packaging is used to achieve many of these objectives. For example, plastic sheeting can be used to form plastic bags that can serve a wide range of purposes. However, the plastic bags that are formed from the plastic sheeting are generally created by a heat sealing process that seals the bag closed once the items to be packaged are placed in the bag. The heat seal method can be cumbersome and depending on the items being packaged, the heat used to seal the bags can disturb the contents therein. This is especially true for individual packages that are custom made to different sized items such that the packages are made around the item.

Adhesives can be used to adhere plastic sheets together, but the placement of the adhesive has to be very precise because generally such adhesives stick indiscriminately to most everything the adhesives contact. Thus, if the use of the adhesive is not precise, the adhesive may stick to the items placed in the bag.

Cohesives, which are often referred to in the industry as self-seal, cold seal, or cold seal adhesives, were thought to be a good alternative since, once they are cured on a substrate, they only stick together to form a seal when portions of the cohesive come in contact with each other. Cohesives, however, have been used on plastic sheeting to very limited success. In particular, the cohesive has to be aggressive enough to stick to one surface of a plastic sheet, but passive enough, once cured, to not stick to the opposing surface of the plastic sheet when bundled for transport, such as, for example, when rolled onto a roll. Since the surfaces of the plastic sheet are composed of the same material, finding the right balance of tack for the cohesive is extremely hard to accomplish. If the cohesive is too aggressive, the cohesive will stick to both the surface to which it was applied and cured and to the opposing surface when the plastic sheeting is rolled onto a roll thereby causing blocking. If the cohesive is too passive, it will not stick to the surface to which it was applied and cured rendering the plastic sheet useless for its intended purpose. To combat this issue, one surface of the plastic sheet may be dyne treated, i.e., provided with a corona treatment, to create a difference in the surfaces such that a cohesive is more likely to securely attach to the treated surface than the untreated opposing surface of the plastic sheet. Even with the difference in the treated surface and the untreated opposing surface, the window within which the cohesive can properly operate is small.

Therefore, a need exists for packaging sheets and material that can be sealed without the need for exposure to heat and that still provides a seal that does not break easily and prevents the leakage of the contents being sealed within the packaging formed by the packaging sheets and material.

SUMMARY

It is an object of the present disclosure to provide novel packaging sheets, packaging materials and related methods of making and using. More specifically, the subject matter disclosed herein relates to packaging sheets and materials that can form a package by sealing a cohesive layer of a sheet to itself or to a cohesive layer of a different sheet and methods related to the packaging sheets and materials.

While a few objects of the presently disclosed subject matter have been stated hereinabove, which can be achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter to one of ordinary skill in the art is set forth more particularly in the remainder of the specification and figures attached herewith, including reference to the accompanying figures in which:

FIGS. 12A-12C illustrate perspective views of other embodiments of packaging sheets according to the subject matter disclosed herein.

Figure 1A:
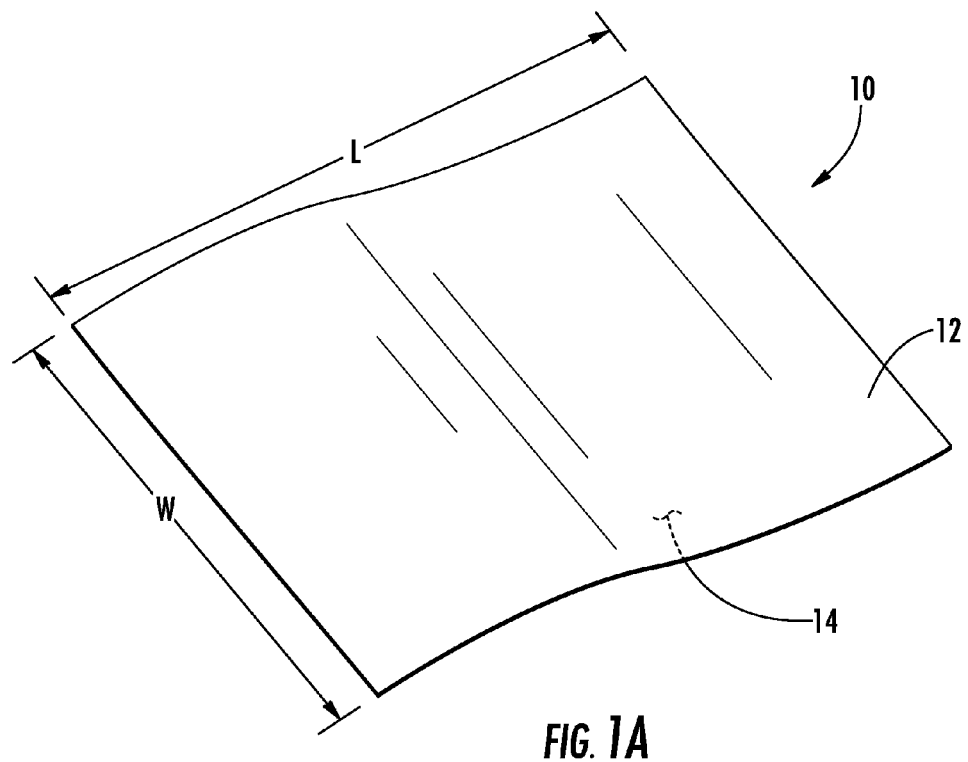
FIG. 1A illustrates a perspective view of an embodiment of a packaging sheet according to the subject matter disclosed herein.

Repeat use of reference characters in the present specification and drawings is intended to represent the same or analogous features or elements of the invention.

DETAILED DESCRIPTION

Reference will now be made in detail to the description of the present subject matter, one or more examples of which are shown in the pictures and figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Similarly, in the present disclosure, when a feature, element, component, region, layer and/or section is being described as "top", "bottom," "front," "rear," "side," etc., it should be understood that such terms are relative and not absolute. Thus, something that is described with the adjective of "top" may also be considered on a side or a bottom depending on the orientation of the larger subject being described. Additionally, when a feature, element, component, region, layer and/or section is being described as "under," "on," or "over" another feature, element, component, region, layer and/or section, it is to be understood that the features, elements, components, regions, layers and/or sections can either be directly contacting each ether or have another feature, element, component region, layer and/or section between them, unless expressly stated to the contrary. Similarly, directional movement, such as "back and forth/" "forward," "backward," "up," "down," or the like are to be understood as relative descriptions that can change depending on the orientation of the subject matter relative to the viewer. Thus, these terms are simply describing the relative position of the features, elements, components, regions, layers and/or sections to each other and do not necessarily mean an absolute position or direction since the relative position above or below depends upon the orientation of the subject matter to the viewer.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a packaging sheet, packaging material and/or methods of making or using the same and are not intended to limit the scope of the subject matter disclosed herein.

"Cohesive" or "cohesives" as used herein means substances that can be applied to a substrate and once cured generally only bond or adhere to itself and not to other non-adhesive materials or substances. Thus, cohesives are substances that, once applied and cured, generally only adhere or bond together to form a seal when a portion of the cohesive come in contact with another portion of the cohesive and generally does not form a seal with other non-adhesive materials or substances with which the cohesive conies into contact. Cohesives, as used herein, are often referred to in the industry as self-seal, cold seal, or cold seal adhesives.

"Adhesive" or "adhesives" as used harem means substances that are used to secure materials, such as substrates, together by binding or adhering to the materials with which they some in contact and resist separation of the materials even under force. Thus, adhesives are substances that have the ability to secure together non-similar materials or substances by binding and/or adhering to the non-similar materials or substances.

"Pressure-sensitive adhesives" as used herein means adhesives that can have binding or adhesion or enhanced binding or adhesion to non-similar materials or substances when placed under some level of pressure.

"Packaging material" as used herein means one or more items or materials are used to create packages and that can be packed or bundled together or processed in some manner to form a unit for transport.

Figure 1B:
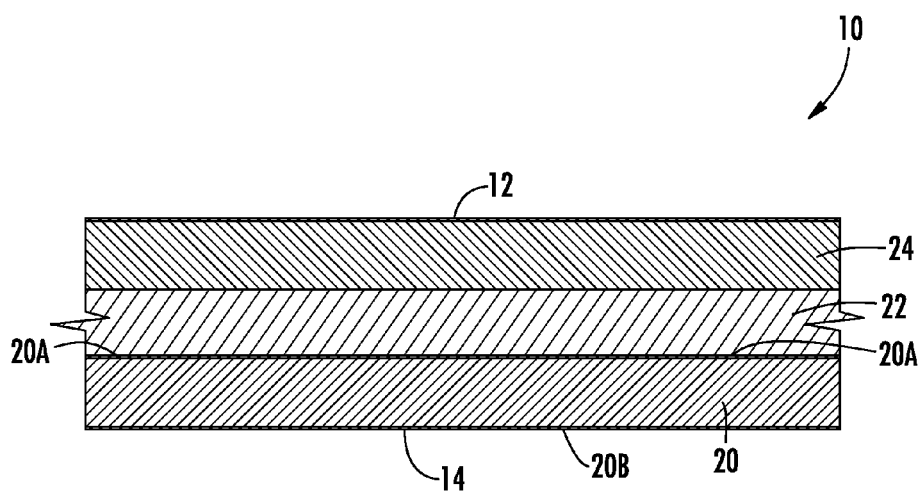
FIG. 1B illustrates a schematic cross-sectional side view of the embodiment of the packaging sheet according to FIG. 1A.

Referring to FIGS. 1A and 1B, an embodiment is provided of a packaging sheet, generally designated 10. The packaging sheet 10 can comprise a first substrate 20 having a first surface 20A and an opposing second surface 20B. An adhesive layer 22 can be disposed on the first surface 20A of the first substrate 20. A cohesive layer 24 can be disposed on the adhesive layer 22, such that the cohesive forms a first outer surface 12 of the packaging sheet 10 and the opposing second surface 20B of the first substrate 20 forms a second outer surface 14 of the packaging sheet 10.

One or more packaging sheets 10 can be used to form a sealed package by having the cohesive layer 24 of a sheet 10 bond to itself or to a cohesive layer of a different sheet. By using the combination of the pressure-sensitive adhesive layer 22 on the first surface 20A of the first substrate 20 and the cohesive layer 24 applied on top of the adhesive layer 22, a stronger, tighter seal can be accomplished than by using only the cohesive layer on a first substrate, such as a polypropylene film.

The packaging sheet 10 can have a variety of different widths W and lengths L depending on the parameters needed to be met by the package to be constructed from the packaging sheet 10 for the item to be packaged. In some embodiments, the packaging sheet 10 can comprise a square shape. In some embodiments, the packaging sheet 10 can comprise other rectangular shapes. The width W can range between about 3 inches and about 72 inches. In some embodiments, the width W may be larger than 72 inches. In some embodiments, the width W can be about 12 inches, about 18 inches, about 24 inches or about 30 inches. In some embodiments, the width W can be about 36 or about 72 inches. Similarly, the length L can range between about 4 inches and about 120 inches. In some embodiments, the length L may be larger than 120 inches. In some embodiments, the length L can be about 12 inches, about 18 inches, about 24 inches or about 30 inches. In some embodiments, for example, the length L can be about 36, about 48 inches, about 60 inches, about 72 inches, about 84 inches, about 96 inches, about 108 inches, or about 120 inches.

The first substrate 20 can comprise a variety of different types of substrates depending on the desired parameters of the packaging sheets 10. For example, in some embodiments, the first substrate 20 can comprise a polymeric film. For example, the first substrate 20 can comprise a thermoplastic film in some embodiments. The thermoplastic film con comprise a polyolefin film such as a polypropylene film, for instance. Alternatively, the thermoplastic him can comprise at least one of a polyethylene film, a nylon film, or e polyester film. In some embodiments, the first substrate 20 can comprise tri-layered films or other multi-layered films, such as nine-layered films.

In some embodiments, the first substrate 20 can comprise a suitable fabric or a paper or other wood, pulp product. For example, in some embodiments, the first substrate 20 can comprise a nonwoven fabric such as a spunbonded fabric, a meltblown fabric, a needlepunched fabric, a stitchbonded fabric or the like. The fabric that can be used as a first substrate can also comprise any of a variety of woven fabrics or knitted fabrics. In some embodiments, the first substrate 20 can be a laminate or a fabric with a film coating. In some embodiments, the first substrate can comprise a more rigid plastic, wood, or metal.

The first surface 20A of the first substrate 20 can be dyne treated, i.e., treated with a corona treatment, to create a surface more contoured or rough surface that increases the adhesion of the pressure-sensitive adhesive layer 22 thereto, but that does not compromise the integrity of the first substrate 20 visually or structurally. For example, the dyne treatment can range between about 38 and about 50 on the dyne scale.

The adhesive layer 22 can comprise any of a number of adhesives, such as pressure-sensitive adhesives. Pressure-sensitive adhesives are adhesives which form bonds when pressure is applied to marry the respective adhesive with the adherend. In many embodiments, no additional solvents, water, or heat may be needed to activate these adhesives. The adhesive layer 22 can be the same or similar pressure-sensitive adhesives as those used in pressure sensitive tapes, labels, note pads, automobile trim, and a wide variety of other products. The pressure-sensitive adhesive can comprise a solvent-based or a water-based pressure-sensitive adhesive, Examples of pressure-sensitive adhesives that can be used to more or less effect include certain ROBOND™ products, certain PRIMAL™ products, MORSTIK™, and certain RODERM™ products, all of which are supplied by the Dow Chemical Company, to name a few.

The cohesive layer 24 can comprise a variety of different cohesives as wall. The cohesives that can be used to form the cohesive layer 24 can have different bond strength depending on the desired parameters of the respective packaging sheet. For many applications, the cohesives that can be used to form the cohesive layer can have a high bond strength. While, depending on the bond strength, cohesives can slightly tack or stick to other non-adhesive material, cohesives generally only provide a strong seal to themselves. When the cohesive layer coated on the first substrate comes into contact with itself or another substrate coated with the same cohesive, the bond can result by applying appropriate pressure that contacted cohesives. In the embodiments of the packaging sheeting provided, the pressure-sensitive adhesive layer securely holds the cohesive layer to the first substrate of the packaging sheets. Thus, through the use of the cohesive layer, the packaging sheet can be bonded to itself or to another packaging sheet. In some embodiments, the cohesive can comprise a water-based cohesive. In some embodiments, the cohesive can comprise a solvent-based cohesive. Examples of cohesives that can be used to mom or less affect include COSEAL™ and certain ROBOND™ CS, which are supplied by the Dow Chemical Company, and the cohesives used in CRO-NEL® and NYVEL® products, which are produced and sold by Automated Solutions, LLC, to name a few.

The structure of a pressure sensitive adhesive layer applied onto a first substrate and a cohesive layer applied on the pressure sensitive adhesive layer can be especially beneficial when the first substrate or the surface of the first substrate is polymeric film such as a thermoplastic film. Tests have shown that the peel strength of a folded and pressed portion of a packaging sheet having a pressure sensitive adhesive layer applied onto a polymeric film and a cohesive layer applied on the pressure sensitive adhesive layer was as much as double, and in some cases more than double, the peel strength of a folded and pressed portion of a packaging sheet having just a cohesive layer applied onto a polymeric film.

Embodiments of packaging sheets according to the present subject matter have been tested on an Instron tester where a three inch long and one inch wide sample of a packaging sheet having a polymeric film as a substrate is secured to another three inch long and one inch wide sample of a packaging sheet having a polymeric film as a substrate so that one square inch of area is pressed with the cohesive layers sealed together. The free ends of the samples are secured in the Instron tester and pulled apart. Depending on the type and amount of pressure sensitive adhesive and cohesive applied, it has be find that the peel strength can range between about 0.5 lbs. and about 10 lbs. For example, for some embodiments of body bags, the peel strength can range between about 4 lbs. to about 10 lbs. For other applications of the packaging sheets according the present disclosure, the peel strength may be lower depending on the need.

Figure 2A:
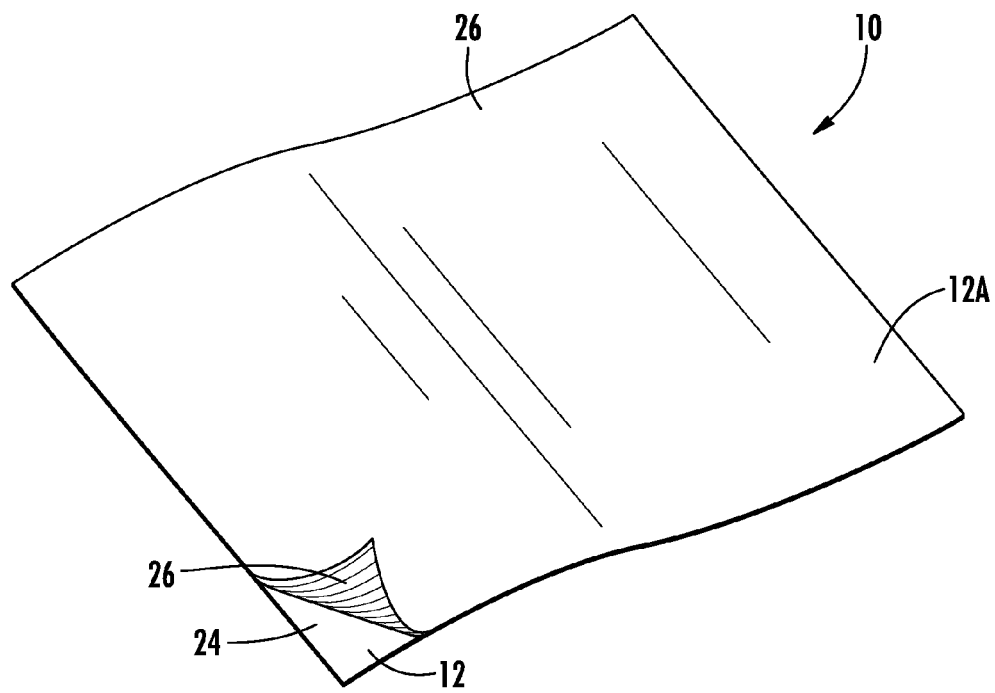
FIG. 2A illustrates a perspective view of another embodiment of a packaging sheet according to the subject matter disclosed herein.
Figure 2B:
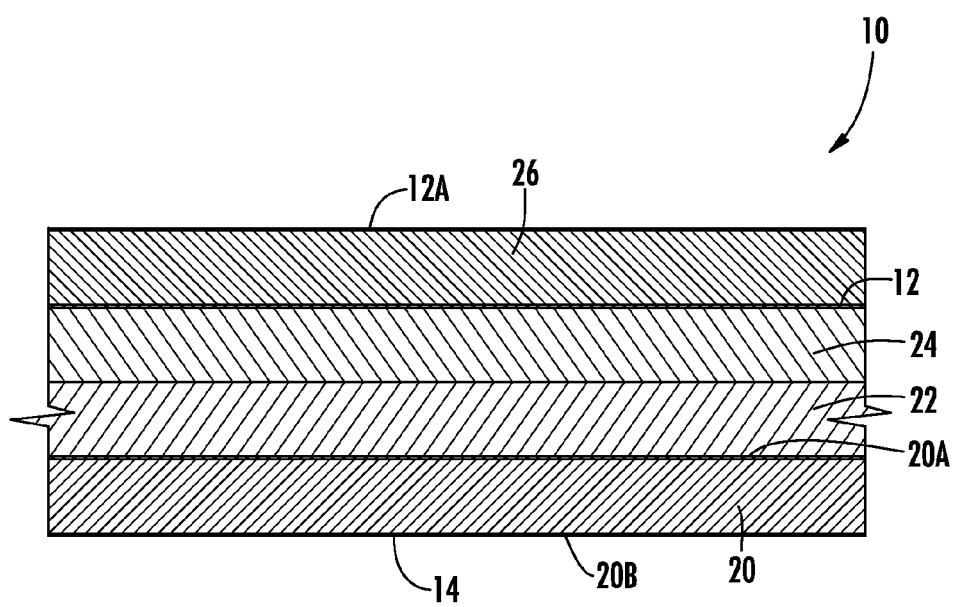
FIG. 2B illustrates a schematic cross-sectional side view of the embodiment of the packaging sheet according to FIG. 2A.

Referring to FIGS. 2A and 2B, a similar embodiment is provided of a packaging sheet, also generally designated 10. The packaging sheet 10 can comprise a first substrate 20 having a first surface 20A and an opposing second surface 20B. An adhesive layer 22 can be disposed on the first surface 20A of the first substrate 20. For example, the adhesive layer 22 can be a pressure-sensitive adhesive. A cohesive layer 24 can be disposed on the pressure-sensitive adhesive layer 22, such that the cohesive forms a first outer surface 12 of the packaging sheet 10 and the opposing second surface 20B of the first substrate 20 forms a second outer surface 14 of the packaging sheet 10. The first substrate 20, the pressure-sensitive adhesive layer 22, and the cohesive layer 24 of the embodiment shown in FIGS. 2A and 2B can comprise any of the examples provided above with reference to FIGS. 1A and 1B. The packaging sheet 10 can further comprise a protective second substrate 26 removably disposed on the first outer surface 12 of the packaging sheet 10.

For example, the protective second substrate 26 can be removably disposed on the cohesive layer 24 that forms the first outer surface 12 of the packaging sheet 10, such that the second substrate 26 comprises a temporary first outer surface 12A. The second substrate 26, for instance, can comprise a releasable substrate. In some embodiments, the releasable substrate 26 can comprise a release film or a release paper. In some embodiments, the releasable substrate 26 can comprise a silicon coated film. In some embodiments, the releasable substrata 26 can comprise a textured or embossed release film. In some embodiments, the releasable substrate 26 can comprise a kraft paper. The releasable protective second substrate 26 can he placed on the cohesive layer 24 to prevent accidental contact between the portions of the cohesive layer 24, which can cause unwanted and damaging adhesion and creasing in the packaging sheet 10.

Thus, in some particular embodiments, a packaging sheet 10 can be provided that can comprise a film 20 having a first surface 20A and an opposing second surface 20B. The packaging sheet 10 can also comprise a layer 22 applied on the first surface 20A of the film 20. The packaging sheet 10 can additionally comprise a cohesive layer 24 applied on the adhesive layer 22, such that the adhesive is positioned mainly between the first surface 20A of the film 20 and the cohesive. The cohesive layer 24 can thereby form a first outer surface 12 of the packaging sheet 10 and the opposing second surface 20B of the film 20 can form a second outer surface 14. Further, the packaging sheet 10 can comprise a releasable protective substrate 26 removably disposed on the cohesive layer 24 that forms the first outer surface 12 of the packaging sheet 10. Thereby, the second substrate 26 can comprise a temporary first outer surface 12A.

Figure 3A:
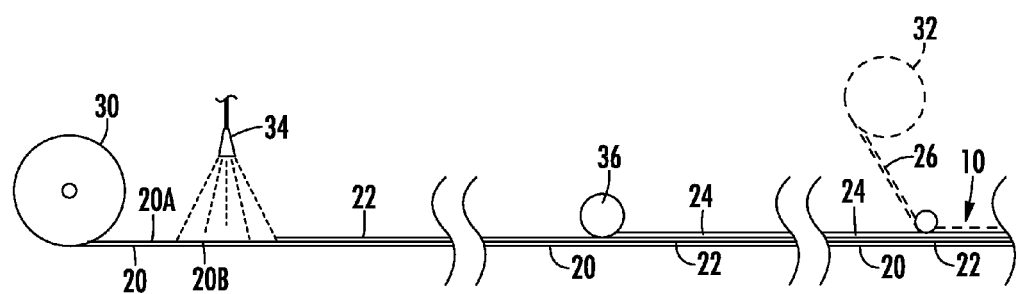
FIG. 3A illustrates a schematic side view of at least a portion of an embodiment of a method of forming a packaging sheet according to the subject matter disclosed herein.
Figure 3B:
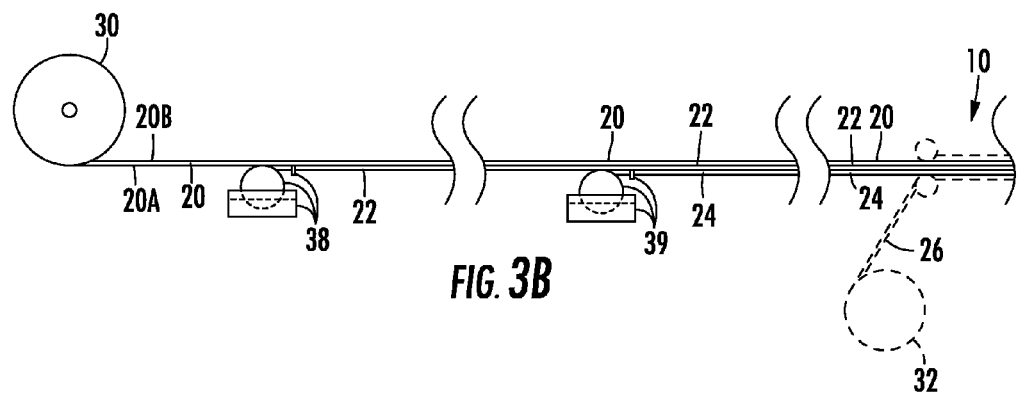
FIG. 3B illustrates a schematic side view of at least a portion of another embodiment of a method of forming a packaging sheet according to the subject matter disclosed herein.

The packaging sheets 10 described above can be manufactured in different manners. Examples of methods of making such packaging sheets 10 are schematically illustrated in FIGS. 3A-3B. Such methods can include providing a first substrate 20, for example, from a roll 30. The first substrate 20 can have a first surface 20A and an opposing second surface 20B. An adhesive layer 24 can be applied on the first surface 20A of the first substrate 20. Similarly, a cohesive layer 24 can be applied on the adhesive layer 22, such that the cohesive forms a first outer surface of the packaging sheet 10 and the opposing second surface of the first substrate 20 forms a second outer surface.

As shown in FIG. 3A, the adhesive layer 22, which can be a pressure sensitive adhesive, can be applied by a spray applicator 34 spraying the pressure-sensitive adhesive onto the first surface 20A of the first substrate 20. Depending on the pressure-sensitive adhesive used, in some embodiments, different other steps (not shown in FIG. 3A) may follow to at least partially dry and possibly cool the pressure-sensitive adhesive on the first surface of the first substrate 20 to aid in establishing a pressure-sensitive adhesive layer 22. As shown in FIG. 3A, the cohesive layer 24 can be applied by a roil applicator 36 rolling the cohesive on the pressure-sensitive adhesive layer 22 to form the cohesive layer 24. Rolling the cohesive on the pressure-sensitive adhesive layer 22 prevents adding undue stress and pressure on the cohesive during application. Again, depending on the cohesive used. In some embodiments, different other steps (not shown in FIG. 3A) may follow to at least partially dry and possibly cool the cohesive on the pressure-sensitive adhesive layer to aid in establishing a cohesive layer 24. Optionally, a releasable protective second substrate 26 can be pulled from a roll 32 to reside over the first outer surface formed by the cohesive layer 24.

In some embodiments, different other steps can be included in the process, including, but not limited to, using a one or more perforators to provide perforation lines through the packaging sheets and/or the releasable second protective substrate. For example, perforators can be positioned after the releasable second protective substrate is applied on top of the cold seal adhesive layer of the packaging sheet. In some embodiments, perforators, such as roll perforators and/or press perforators, can have a cutting depth that only perforates the releasable second protective substrate. In some embodiments, perforators, such as roll perforators and/or press perforators, can have a cutting depth that perforates the packaging sheets, and if applied, the releasable second protective substrate as well. In some embodiments of the process, a perforator may provide perforation lines in the releasable second protective substrate 26 before it is applied over top the cohesive layer 24 of the packaging sheet 10.

Referring to FIG. 3B, a slightly different embodiment is shown, where the adhesive layer 22 can be applied by rolling the adhesive on the first surface 20A of the first substrate 20. In the same or similar manner, the cohesive layer 24 can be applied by roiling the cohesive onto the adhesive layer 22. For example, the adhesive layer 22 can be applied by a roller applicator 38 that can include a scraper for rolling the adhesive onto the first surface 20A of the first substrate 20 that is removed from roll 30. The cohesive layer 24 can then be applied by a roll applicator 30 rolling the cohesive on the adhesive layer 22 to form the cohesive layer 24. Optionally, a releasable protective second substrate 26 can be pulled from a roll 32 to reside over the first outer surface formed by the cohesive layer 24.

Again, depending on the adhesive and the cohesive used, in some embodiments, different other steps (not shown in FIG. 3B) can follow the respective applications of the adhesives to at least partially dry and possibly cool the respective adhesive to aid in establishing a adhesive layer 22 and a cohesive layer 24. Similarly, perforators may be provided in the process to provide perforation lines in the packaging sheet. In embodiments that include a releasable second protective substrate, perforators may be provided in the process to provide perforation lines in the packaging sheet and/or the releasable second protective substrate.

As shown in both FIGS. 3A and 3B, a releasable protective second substrate 26 can optionally be applied on the cohesive that forms the first outer surface of the packaging sheet 10 depending on the desired end use. The second substrate 26 can be removable from the cohesive that forms the first outer surface of the packaging sheet 10. In this manner, the releasable protective second substrate 26 can comprise a temporary first outer surface over the first outer surface of the packaging sheet 10.

Figure 3C:
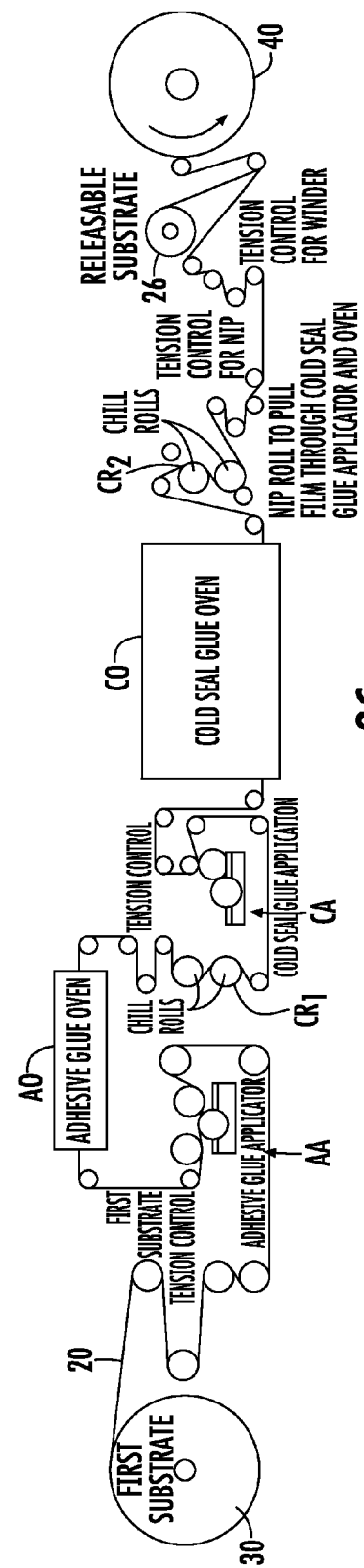
FIG. 3C illustrates a schematic side view of at least a portion of a further embodiment of a method of forming a packaging sheet according to the subject matter disclosed herein.

FIG. 3C illustrates a more detailed embodiment of a method of making a packaging sheet. A roll 30 of the first substrate 20 is provided. The first substrate 20, such as a polymeric film can be pulled from the roll under tension. The first substrate 20 can pass over an adhesive applicator, generally designated AA, that rolls on and evenly spreads the pressure-sensitive adhesive onto a first surface of the substrate 20. The first substrate 20 with the pressure-sensitive adhesive layer on its first surface can then be transported through an oven AO to heat the pressure-sensitive adhesive layer to remove water or solvent from the pressure-sensitive adhesive and to stabilize the pressure-sensitive adhesive layer. The first substrate 20 with the pressure-sensitive adhesive layer on its first surface can then be cooled to further stabilizer and harden the pressure-sensitive adhesive layer by transporting if over chilled rollers $CR_1$.

The first substrate 20 can then pass over an adhesive applicator, generally designated CA, that rolls on and evenly spreads the cohesive onto the pressure-sensitive adhesive layer of the substrate 20. The first substrate 20 with the cohesive on the pressure-sensitive adhesive layer can then be transported through an oven CO to heat the cohesive layer to remove water from the cohesive and to stabilize the cohesive layer. The first substrate 20 with the cohesive layer on the pressure-sensitive adhesive layer can then be cooled to further stabilize and harden the cohesive layer by transporting it over chilled rollers $CR_2$. At this point, the tension can be adjusted so that a releasable substrate 26, such as a release paper or film, can be applied over the cohesive layer. In some embodiments, the tension at this portion of the process can approach zero. The releasable substrate 26 can then be applied to the cohesive layer to provide an add level of protection thereover and the continuous packaging sheet can be in turn rolled onto another roll 40 and/or can be processed into individual sheet, either from a finished roll 40 or from the end of the process line. For example, one or more perforators can be provided to create perforation lines through the packaging sheets and/or the releasable second protective substrate.

Figure 4A:
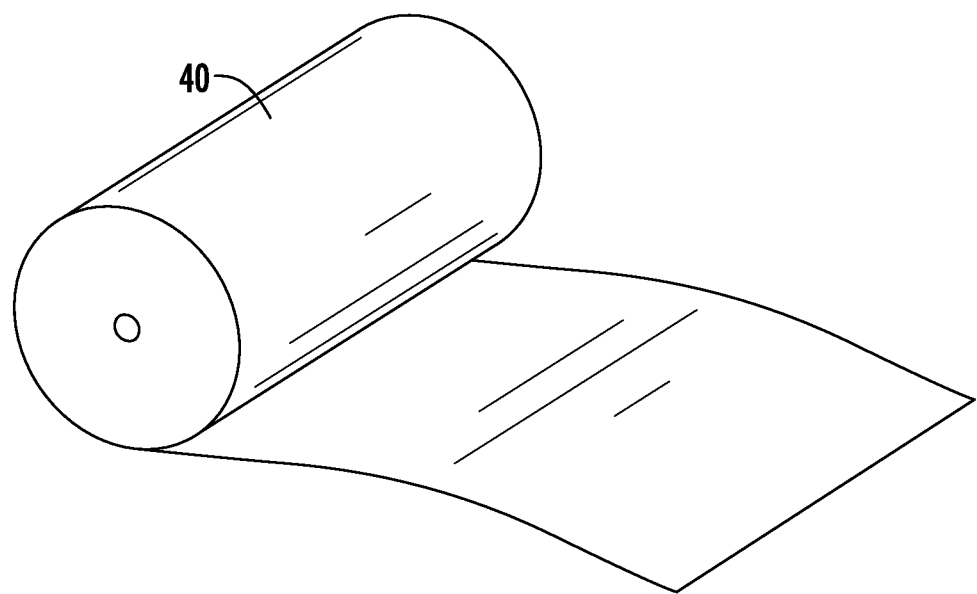
FIG. 4A illustrates a perspective view of an embodiment of packaging material comprising one or more packaging sheets according to the subject matter disclosed herein.
Figure 4B:
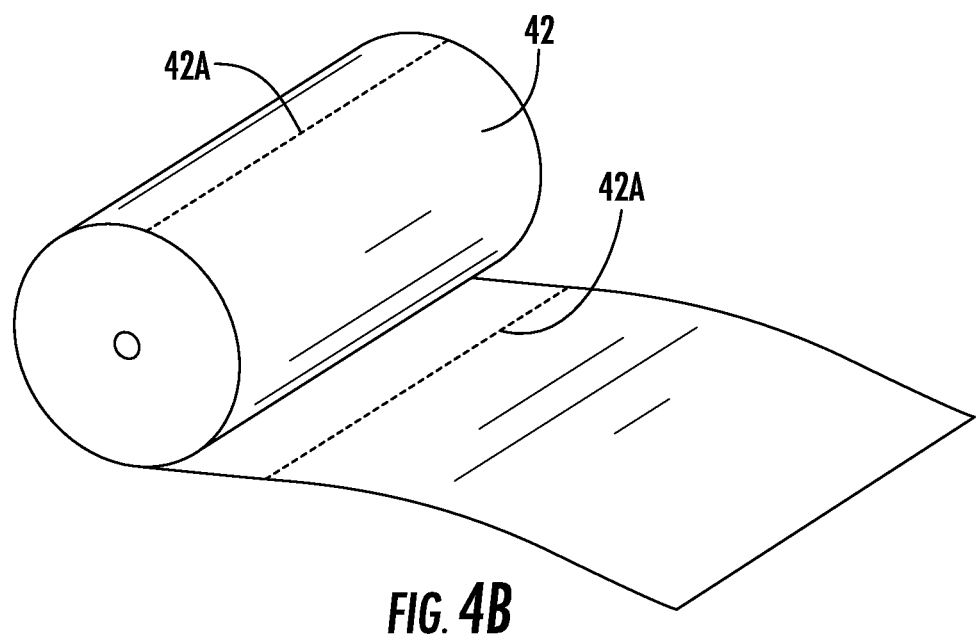
FIG. 4B illustrates a perspective view of another embodiment of packaging material comprising one or more packaging sheets according to the subject matter disclosed herein.
Figure 4C:
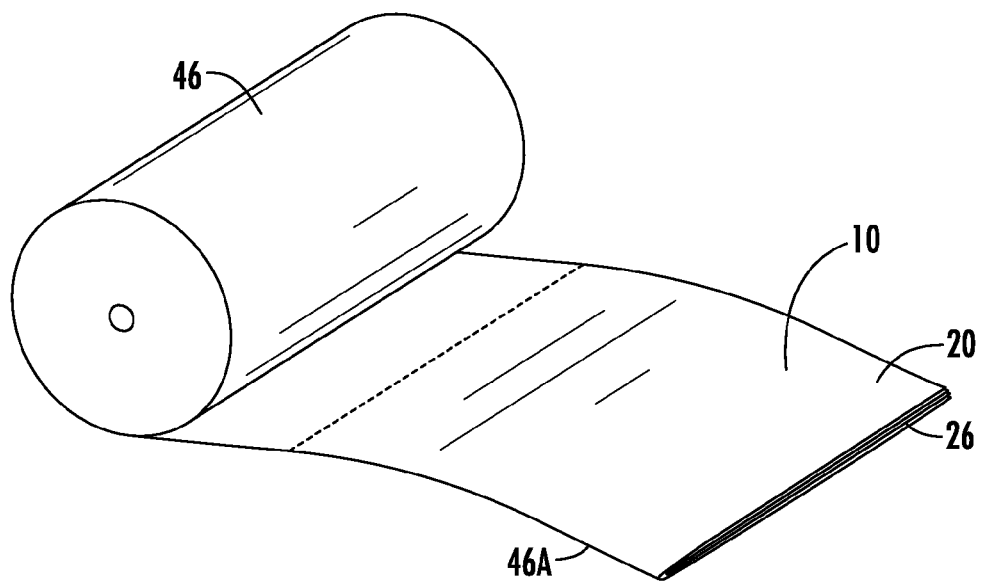
FIG. 4C illustrates a perspective view of a further embodiment of packaging material comprising one or more packaging sheets according to the subject matter disclosed herein.

As shown in FIGS. 4A-4C, the packaging material as disclosed herein can comprise a roll of packaging material separable into individual packaging sheets. As shown in FIG. 4A, the roll of packaging material 40 can comprise a continuous sheet that is capable of being cut into different lengths to form packages of different sizes. For example, once an appropriate length has been determined and measured out, a blade or other cutting mechanism can be used to out the continuous sheet into an individual packaging sheet. In some embodiments, as shown in FIG. 4B, the roll of packaging material 42 can comprise a continuous sheet having perforation lines 42A at multiple positions along its length. Thereby, the continuous sheet can be torn along the perforation lines 42A to form individual packaging sheets when the need arises. Thus, the roll of packaging material 42 can comprise joined sheets that are removable from the roil as individual sheets.

In some embodiments, as shown in FIG. 4C, the one or more sheets 10 can be folded along a foldline 46A so that the releasable protective second substrate 26 of the sheet 10 faces itself upon folding before the one or more sheets 10 are rolled into the roll of packaging material 46. In such embodiments, the first substrates 20 of the sheets 10 face outward. For example, after the packaging sheets are formed as a continuous sheet, the continuous sheet can be run through a folding machine that can fold the layers of the packaging sheet without creating unwanted creases in the individual layers besides the joint crease of all the layers formed by the folding while, at the same time, not tearing any of the layers. After the folding, the continuous sheet can be rolled into a roll of packaging material 46.

Figure 5:
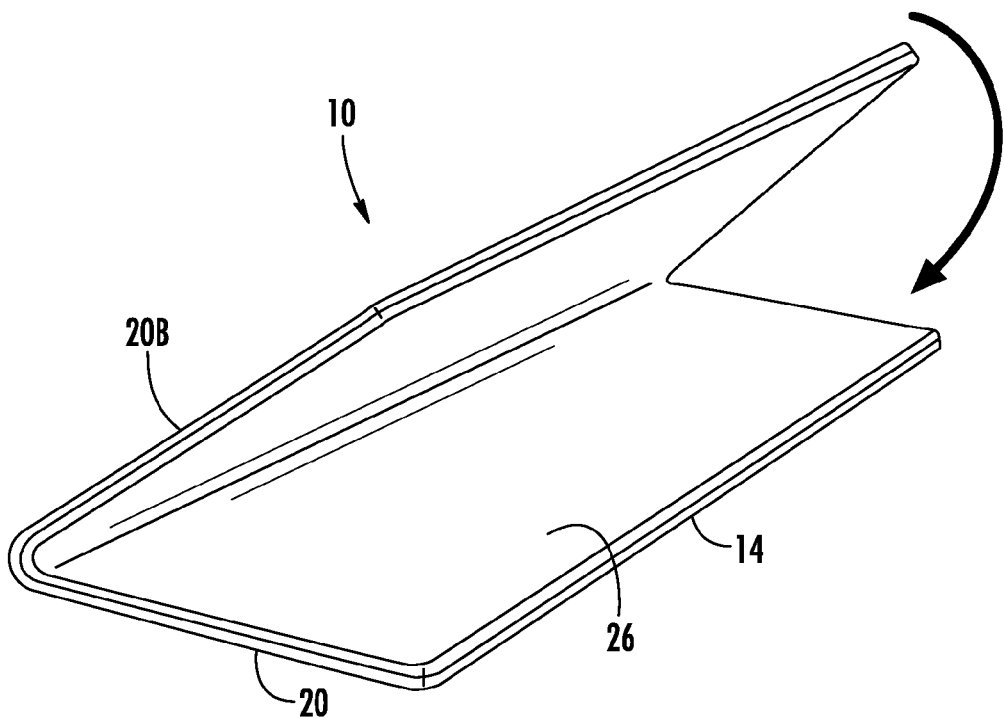
FIG. 5 illustrates a perspective view of an embodiment of a packaging sheet that can be folded to form an individual unit of packaging material according to the subject matter disclosed herein.
Figure 6A:
FIGS. 6A-6E illustrate schematic side views of an embodiment of a method of possible steps of folding a packaging sheet to form an individual unit of packaging material according to the subject matter disclosed herein.
Figure 6B:
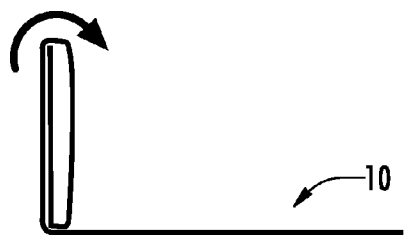
Figure 6C:
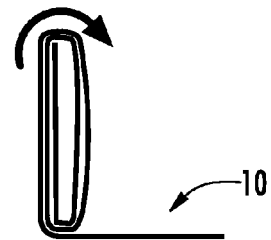
Figure 6D:
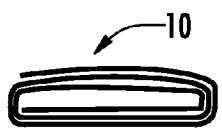
Figure 6E:
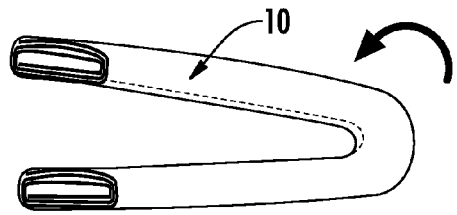
Figure 6F:
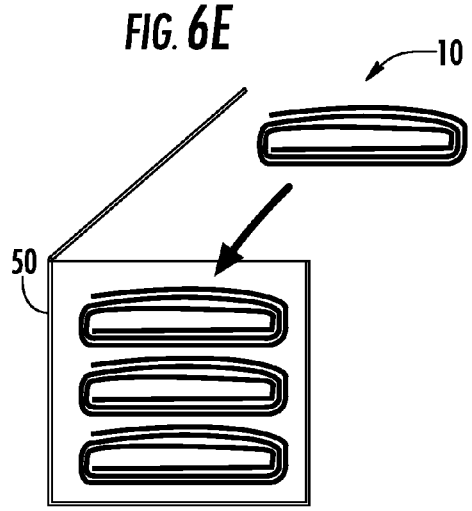
FIG. 6F illustrates a schematic side view of a box that can be packed with individual units of packaging material according to the subject matter disclosed herein.

As shown in FIGS. 5-6F, one or more individual sheets 10 can be folded into individual units of folded sheets. In such embodiments, the releasable protective second substrate of each sheet can be used to minimize, if not prevent, contact of the cohesive layer of the sheet with itself. As shown in FIG. 5, the packaging sheets 10 can be folded so that the releasable protective second substrate 26 of each sheet faces itself upon folding. In such embodiments, the packaging sheets 10 can be further folded so that the opposing second outer surface 14 formed by the second surface 20B of the first substrate 20 faces itself (not shown).

Alternatively, as shown in FIGS. 6A-6F, individual packaging sheets 10 can be folded so that the releasable protective second substrate of each sheet that forms a temporary first outer surface faces the opposing second outer surface formed by the second surface of the first substrate. One or more final folds may be performed such that the second outer surface faces itself as shown, for example, in FIG. 6E. Upon folding, the units of folded sheets can be packaged together. For example, as shown in FIG. 6F, one or more of the individual units of the folded sheets 10 can be packaged into a box 50.

Figure 7A:
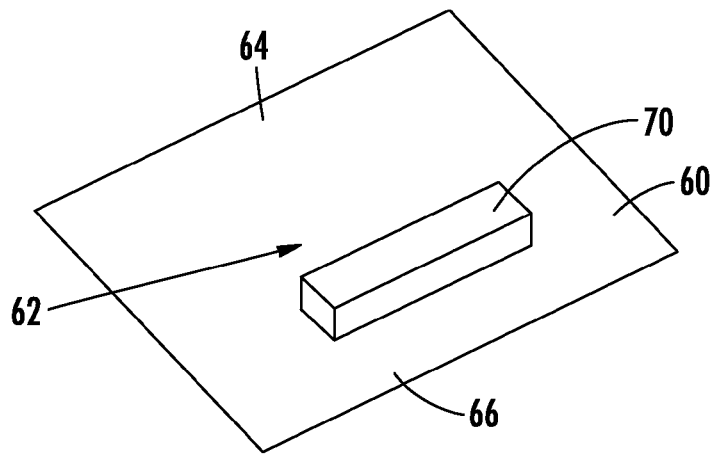
FIGS. 7A-7C illustrate schematic perspective views of different steps that can be used to form a package around an item using a packaging sheet according to the subject matter disclosed herein.
Figure 7B:
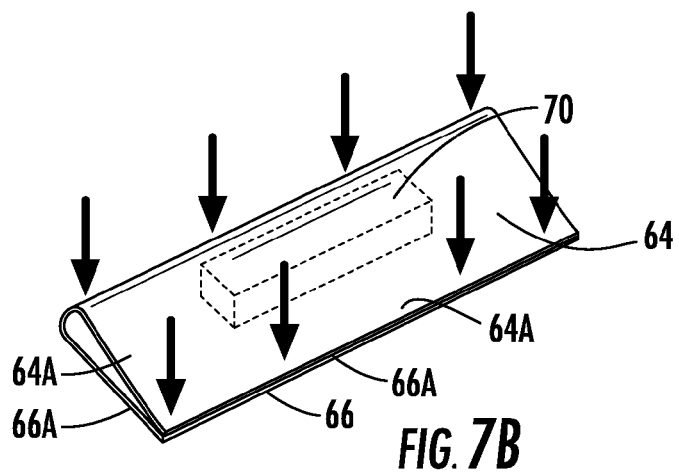
Figure 7C:
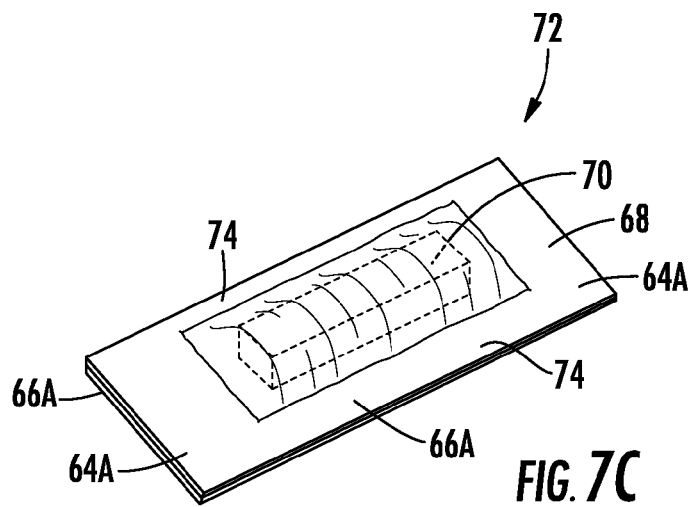

As shown in FIGS. 7A-7C, a single packaging sheet 60 can be used to package an item 70. As above, the packaging sheet 60 can comprise a first substrate having a first surface and an opposing second surface. The first substrate can comprise, for example, a polypropylene film. An adhesive layer can be applied on the first surface of the first substrate with a cohesive applied on the adhesive layer. Thereby, the cohesive can generally form a first outer surface of the packaging sheet and the opposing second surface of the first substrate can form a second outer surface.

The single package sheet 60 can have a first side 64 and a second side 66 and can be opened so that the cohesive layer that forms the first outer surface of the packaging sheet 60 is facing upward. As shown in FIG. 7A, an item 70 to be packaged can be placed in a middle portion 62 of the packaging sheet 60 on the cohesive layer that forms the first outer surface of the packaging sheet 60 between the first and second sides 64, 66 that each run to the middle portion 62. The item 70 as shown in FIGS. 7A-7C is generically shown as a rectangular box. It should be understood that the item 70 can be any of a number of things and can be multiple things. Items that can be wrapped in the packaging sheets described herein can range from books to computer components to multiple single pieced items, sued a toy building blocks, to boxed food items to bodily remains.

As shown in FIG. 7B, the first side 64 of the packaging sheet 60 can be folded over the item 70 so that a portion of the cohesive layer along outer edges 64A of the first side 64 align with and contact a portion of the cohesive layer along outer edges 66A of the second side 66. As shown in FIG. 7C, the outer edges 64A, 66A of the first and second sides 64, 66 of the packaging sheet 60 can be pressed together (as shown by the arrows) to form a seal 68.

In some embodiments as described above, the packaging sheet can further comprise a protective second substrate removably disposed on the cohesive layer that forms the first outer surface of the packaging sheet, such that the second substrate comprises a temporary first outer surface. At least a portion of the protective second substrate from the packaging sheet can be removed to expose the cohesive layer at least along the outer edges. In some embodiments, the entire protective second substrate may be removed. In some embodiments, the protective second substrate may be perforated so that only the portion of the protective second substrate covering the outer edges is removed, in this manner the item can be placed on the remaining portion of the protective second substrate in the middle portion of the packaging sheet to provide an insulative or protective layer between the item and the cohesive layer.

Thus, in the manner described above, a closed package 72 can be formed using a single packaging sheet 60 around the item 70 by forming a seal 68 around a perimeter 74 of the folded packaging sheet 60. In some embodiments (not shown), the seal may be created just along the outer edges of the packaging sheet and not along the folded middle portion of the sheet. A leak-proof, sealed package can still be created in such a manner.

By using the combination of the adhesive layer on the first surface of the first substrate, such as a polypropylene film, and the cohesive layer applied on top of the adhesive layer, a stronger tighter seal can be accomplished than by using only the cohesive layer on the polypropylene film. Depending on the adhesive and the cohesive used, the bond strength can be high enough to enclose human bodily remains in the closed package and the closed package be transported to necessary locations without fear of the bond strength between any of the layers failing or the packaging sheet undesirably tearing. Thereby, a closed packaged formed from the sealed packaging sheet can comprise a container for bodily remains such as a body bag as described in more detail below.

Similarly, a single packaging sheet can be used as a closed package for any number of items such that the package can be used to ship or transport the item to an intended destination while providing protection to the item or items therein. For example, it can be used with one or more books, boxes of perishables, jewelry, food items, small to mid-sized appliances, toys, or the like. Thereby, the closed packaged formed from the packaging sheet can comprise a shipping package. Additionally, the closed package formed by the packaging sheet can comprise a package for preserving the item disposed therein.

Figure 8A:
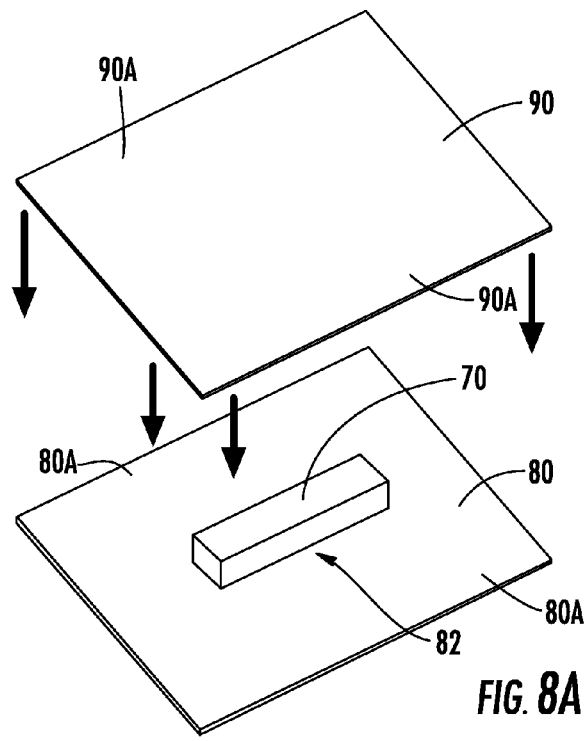
FIGS. 8A-8C illustrate schematic perspective views of different steps that can be used to form a package amend an item using two packaging sheets according to the subject matter disclosed herein.
Figure 8B:
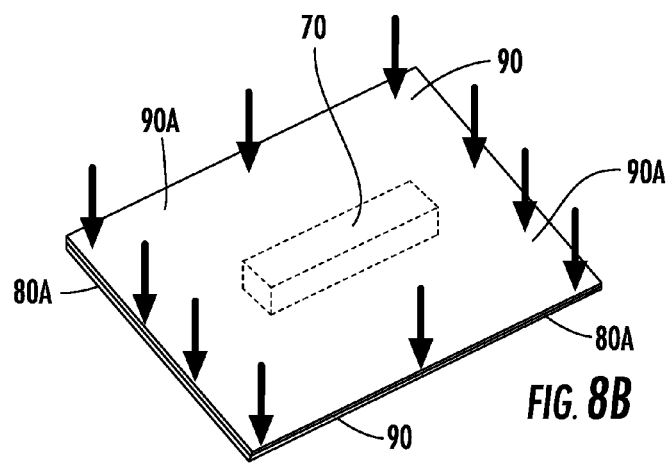
Figure 8C:
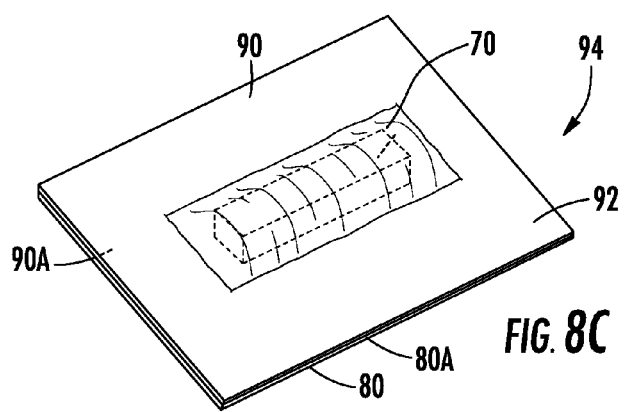

As shown in FIGS. 8A-8C, two or more packaging sheets 80, 90 can be used to enclose an item 70. As above, each packaging sheet 80, 90 can comprise a first substrate having a first surface and an opposing second surface. The first substrate can comprise, for example, a polypropylene film. A adhesive layer can be applied on the first surface of the first substrate with a cohesive applied on the adhesive layer. Thereby, the cohesive can generally form a first outer surface of the packaging sheet and the opposing second surface of the first substrate can form a second outer surface.

A first packaging sheet 80 and a second packaging sheet 90 can be provided with each of the first and second packaging sheets 80, 90 having outer edges 80A, 90A around a perimeter of each sheet 80, 90. As shown in FIG. 8A, an item 70 to be packaged can be placed in a middle portion 82 of the first packaging sheet 80 on the cohesive layer that forms the first outer surface of that packaging sheet 80. The second packaging sheet 90 can be aligned over the first packaging sheet 80 so that a portion of the cohesive layer along the outer edge 80A of the first packaging sheet 80 faces a portion of the cohesive layer along the outer edge 90A of the second packaging sheet 90.

As above, the item 70 as shown in FIGS. 8A-8C is generically shown as a rectangular box. It should be understood that the item 70 can be any of a number of things and can be multiple things. Items 70 that can be wrapped in the packaging sheets 80, 90 described herein can range, for example, from books to computer components to toys to boxed food items to human or animal bodily remains.

As shown in FIG. 8B, the second packaging sheet 90 that is aligned over the first packaging sheet 80, can he placed over the item 70 so that the portion of the cohesive layer along the outer edge 90A of the second packaging sheet 90 contacts the portion of the cohesive layer along the outer edge 80A of the first packaging sheet 80. As shown in FIG. 8C, the outer edges 80A, 90A of the first packaging sheet 80 and the second packaging sheet 90 can be pressed together (as shown by the arrows) to form a seal along the outer edges 80A, 90A at the perimeters of the first and second packaging sheets 80, 90.

In some embodiments as described above, each packaging sheet can further comprise a protective second substrate removably disposed on the cohesive layer that forms the first outer surface of the respective packaging sheet, such that the second substrate comprises a temporary first outer surface. At least a portion of the protective second substrate from each packaging sheet can be removed to expose the cohesive layer at least along the outer edges. In some embodiments, the entire protective second substrate may be removed. In some embodiments, the protective second substrate may be perforated so that only the portion of the protective second substrate covering the outer edges removed. In this manner, the item can be placed on the remaining portion of the protective second substrate in the middle portion of each packaging sheet to provide an insulative or protective layer between the item and the cohesive layer.

Thus, in the manner described above, a closed package 94 can be formed using a two or more packaging sheets 80, 90 around the item 70 by forming a seal around a perimeter 92 of the aligned and overlaying packaging sheets 80, 90. Depending on the adhesive and the cohesive used, the bend strength can be high enough to enclose the human bodily remains in the closed package and the closed package be transported to necessary locations without tear of the bond strength failing or the packaging sheet undesirably tearing. Thereby, a closed packaged formed from the sealed packaging sheets can comprise a container for bodily remains such as a body bag as described in more detail below.

Similarly, two or more packaging sheets can be used to form a closed package for any number of items such that the package can be used to ship or transport the item to an intended destination while providing protection to the item or items therein. For example, first and second packaging sheets can be used as described above with one or more books, boxes of perishables, jewelry, food items, small to mid-sized appliances, toys, or the like. As an example, distribution centers that ship a large number of items can employ a system similar in basic concept to the system shown in FIG. 9.

Figure 9:
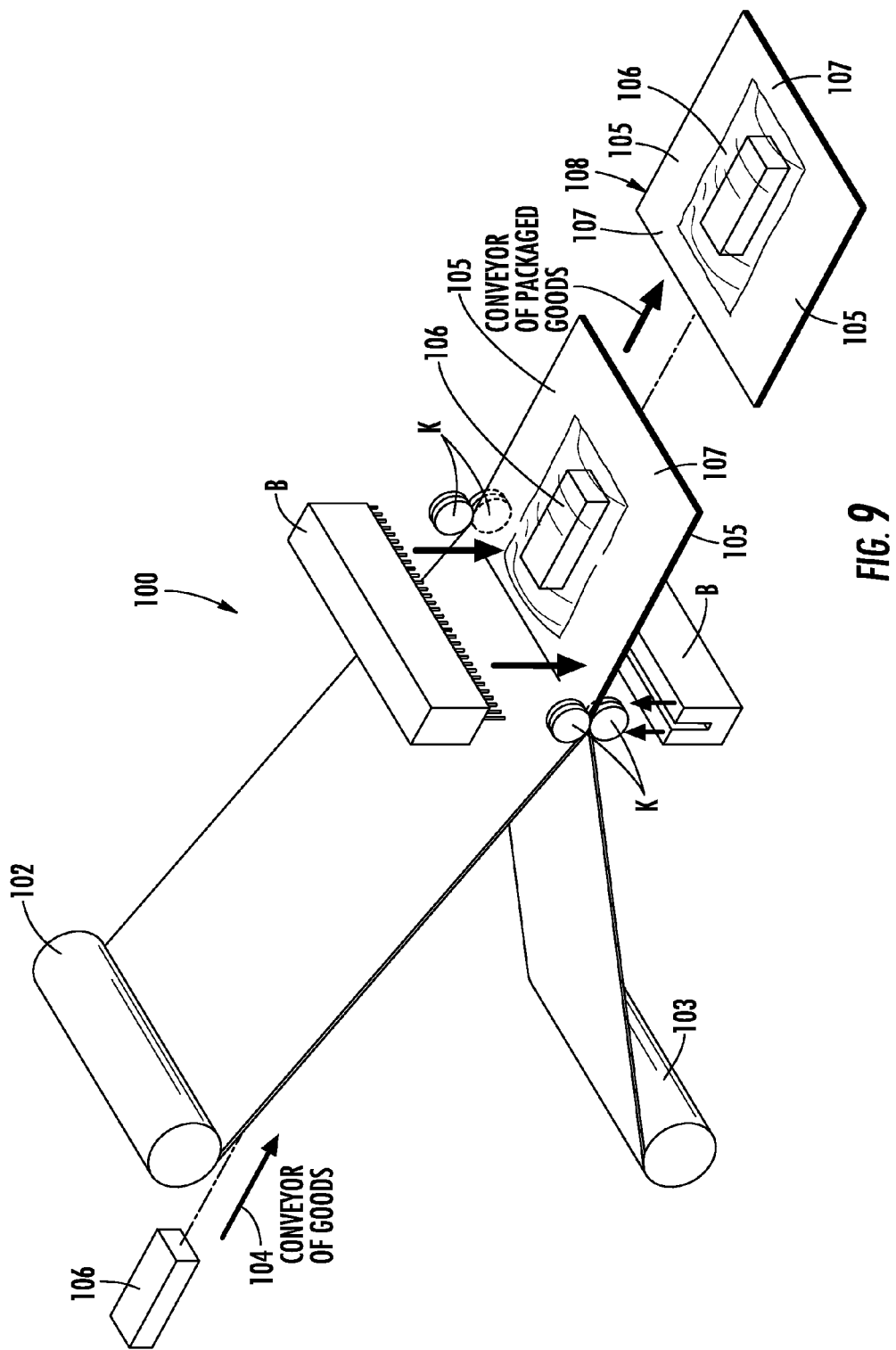
FIG. 9 illustrates a perspective view of an embodiment of another method of using two packaging sheets to form a package around an item according to the subject matter disclosed herein.

As shown in FIG. 9, a system 100 can be provided that includes a roll of first packaging sheets 102 and a roll of second packaging sheets 103 that, in combination with a conveyor system 104, can separately package multiple items 106. Pairs of knurled rollers K aligned on either side can form sealed perimeters 105 as the first packaging sheets 102 and the second packaging sheets 103 align and pass between the pairs of knurled rollers K. Similarly, cutting blocks B can come together to cut the first packaging sheets 102 and the second packaging sheets 103 to form forward and rear seated perimeters 10 with the ends of the first packaging sheets 102 and the second packaging sheets 103. Thereby, a closed package 108 can be formed from the packaging sheets that can comprise a shipping package, generally designated 108. Additionally, the closed package 108 formed by the packaging sheets can comprise a package for preserving the item 106 disposed therein. Such systems similar to that shown in FIG. 9 can be used in distribution centers, such as fulfillment centers for companies like Amazon.com, Inc.

Figure 10A:
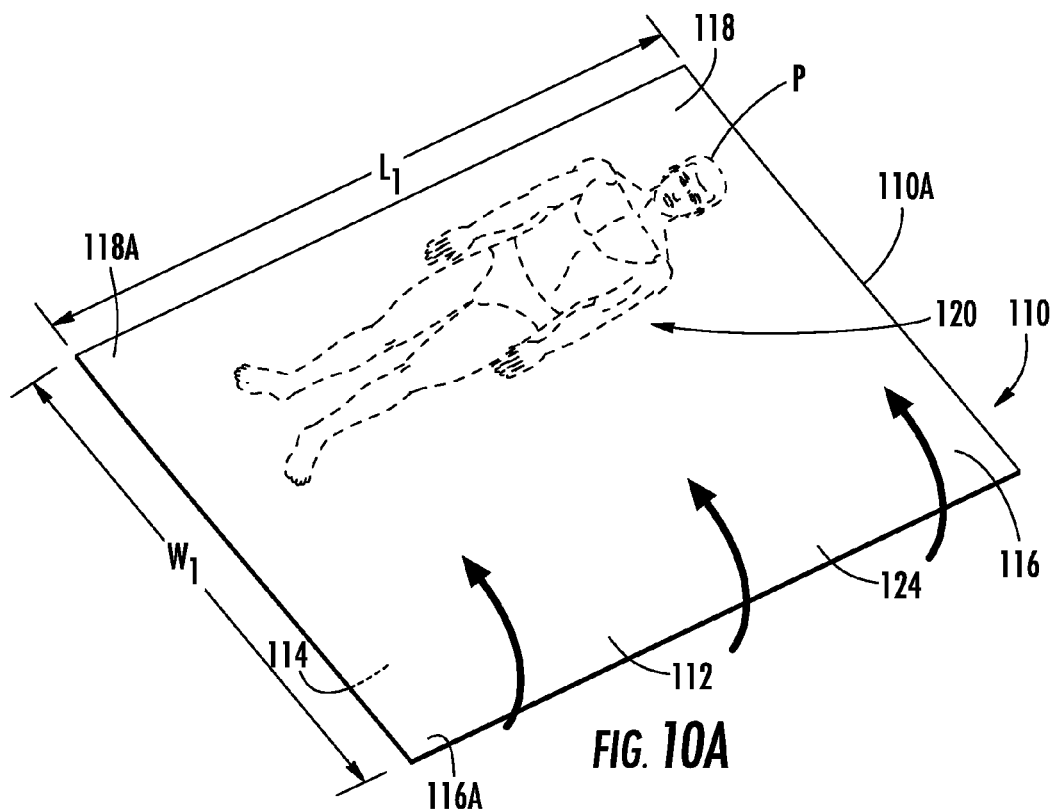
FIGS. 10A-10B illustrate schematic perspective views of an embodiment of a body bag using a packaging sheet according to the subject matter disclosed herein.
Figure 10B:
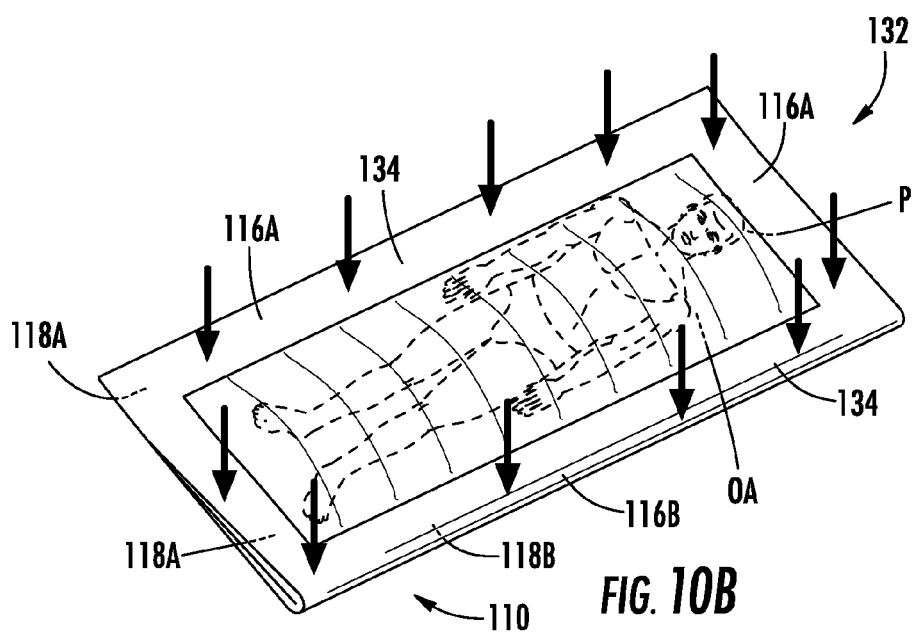

Referring to FIGS. 10A and 10B, a more specific embodiment of a single packaging sheet in the form of an embodiment of a body bag sheet 110 body P or remains in a contained enclosure that can minimize and/or prevent leakage of fluids or other content associated with the body or remains. The body bag sheet 110 can have a width $W_1$ and a length $L_1$ that allow if to be folded around most sizes of human body whether a person was short or tall, thin or obese and still allow a perimeter around the folded body bag sheet 110 to be sealed. For example, the width $W_1$ can be about 72 inches and the length can be about 120 inches, in some embodiments, the width $W_1$ can be more than about 72 inches, and in some embodiments, the width $W_1$ can be less than about 72 inches. Similarly, in some embodiments, the length $L_1$ can be more than about 120 inches, and in some embodiments, the length $L_1$ can be less than about 120 inches.

As described above, the body bag sheet 110 can comprise a first substrate 110A and can have a first outer surface 112 and an opposing second outer surface 114. The first substrate 110A can compose a barrier substrate. For example, the barrier substrate 110A can comprise a barrier-creating nonwoven or film. For example, in some embodiments, the first substrate 110A can comprise a polypropylene film. An adhesive layer can be applied on the first surface of the first substrate with a cohesive layer 124 applied on the adhesive layer. Thereby, the cohesive layer 124 can generally form the first outer surface 112 of the packaging sheet and the opposing second surface of the barrier substrate 110A can form a second outer surface 114.

The body bag sheet 110 can have a first side 116 and a second side 118 and can be opened so that the cohesive layer 124 that forms the first outer surface 112 of the body bag sheet 110 is facing upward. As shown in FIG. 10A, the body P to be enclosed and/or stored can be placed in or proximal to a middle portion 120 of the body bag sheet 110 on the cohesive layer 124 that forms the first outer surface 112 of the body bag sheet 110 between the first and second sides 116, 118. For example, the body P can be placed on one side of the middle portion 120 closer to either the first side 116 or second side 118.

As shown in FIG. 10B, the first side 116 of the body bag sheet 110 can be folded over the body P so that a portion of the cohesive layer 124 along outer edges 116A of the first side 116 can align with and contact a portion of the cohesive layer 124 along outer edges 118A of the second side 118. Further, inner portions 116B, 118B of the body bag sheet 110 closer to the middle portion 120 can be aligned as well. Then, the outer edges 116A, 118A of the first and second sides 116, 118 of the body bag sheet 110 and the inner portions 116B, 118B of the body bag sheet 110 can be respectively pressed together to form a sealed perimeter 134. In some embodiments, the seal created by the pressed outer edges 116A, 118A can create a sealed body bag without the need to press the inner portions 116B and 118B of the body bag sheet 110 together.

Since the cohesive does not readily adhere to other things to form a seal beside other portions of cohesives, a body can be placed on the cohesive layer 124 that forms the first outer surface of the body bag sheet 110 without portions of the body, including but not limited to, hair and skin, securely sticking to the cohesive layer 124.

Thus, in the manner described above, a closed body bag, generally designated 132, with an inner area OA therein in which the body P resides can be formed using a single body bag sheet 110 around a body P by forming a sealed perimeter 134 of the folded body bag sheet 110. By using the combination of the adhesive layer on the first surface of a sturdy barrier substrate 110A and the cohesive layer 124 applied on top of the adhesive layer, a bond strength can be created that is large enough to enclose the human bodily remains in the closed body bag and the closed body bag be transported to necessary locations without fear of the bond strength between any of the layers falling or the packaging sheet undesirably tearing. Thereby, a body bag 132 formed from the sealed body bag sheet 110 can comprise a container for bodily remains.

Figure 11:
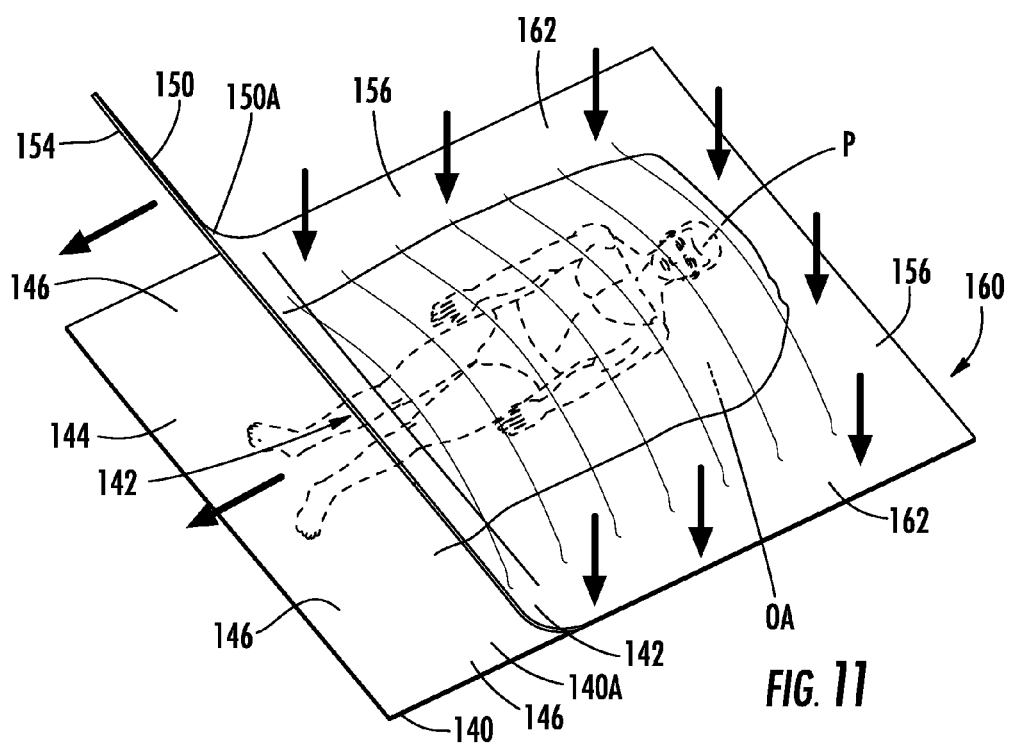
FIG. 11 illustrates a schematic perspective view of an embodiment of a body beg using two packaging sheets according to the subject matter disclosed herein.

Similarly, as shown in FIG. 11, two body bag sheets 140, 150 can be used to enclose a body P in a body bag, generally designated 160. As above, each body bag sheet 140, 150 can comprise a first substrate 140A, 150A and can have a first outer surface and an opposing second outer surface. As an example, for each body bag sheet 140, 150, the first substrate 140A, 150A can comprise a barrier substrate. For example, the barrier substrate 140A, 150A can comprise a barrier-creating nonwoven or film. For example, in some embodiments, the first substrate 140A, 150A can comprise a polypropylene film. For each body bag sheet 140, 150, an adhesive layer, which can comprise a pressure sensitive adhesive, can be applied on the first surface of the first substrate 140A, 150A with a cohesive layer 144, 154 applied on the pressure-sensitive adhesive layer. Thereby, the cohesive layer 144, 154 can generally term a first outer surface of each body bag sheet 140, 150 and the opposing second surface of the first substrate 140A, 150A can form a second outer surface.

The first body bag sheet 140 and the second body bag sheet 150 can each have respective outer edges 146, 156 around a perimeter of the respective body bag sheet 140, 150. As shown in FIG. 11, a body P to be enclosed in a body bag can be placed in a middle portion 142 of the first body bag sheet 140 on the cohesive layer 140 that forms the first outer surface of that body bag sheet 140. The second body bag sheet 150 can be aligned over the first body bag sheet 140 so that a portion of the cohesive layer 144 along the outer edge 146 of the first body bag sheet 140 faces a portion of the cohesive layer 104 along the outer edge 156 of the second body bag sheet 150.

As shown in FIG. 11, the second body bag sheet 150 that is aligned over the first body bag sheet 140, can be placed over the body P so that the portion of the cohesive layer 154 along the outer edge 150A of the second body bag sheet 150 contacts the portion of the cohesive layer along the outer edge 140A of the first body bag sheet 140. As shown at the head end portion of the body bag 160, the outer edges 140A, 150A of the first body bag sheet 140 and the second body bag sheet 150 can be pressed together to form a seal along the perimeters 162 of the first and second body bag sheets 140, 150.

Thus, in the manner described above, the body bag 160 can be formed using a two or more body bag sheets 140, 150 around the the body P by forming a seal around a perimeter 162 of the aligned and overlaying body bag sheets 140, 150. As above, with the body bag embodiment shown in FIGS. 10A-10B, a combination of the pressure-sensitive adhesive layer on the first surface of a sturdy barrier substrate of each body bag sheet 140, 150 and the cohesive layer 144 applied on fop of the pressure-sensitive adhesive layer, a bond strength can be created that is large enough to enclose the human bodily remains in a body bag 160 when sealed closed with the closed body bag being transportable to necessary locations without fear of the bond strength between any of the layers falling or the body bag sheets undesirably tearing. Thereby, a body bag 160 formed from the sealed body bag sheets 140, 150 can comprise a container for bodily remains.

In some embodiments as described above, the body bag sheet 110, 140, 150 can further comprise a protective second substrate removably disposed on the cohesive layer that forms the first outer surface of the body bag sheet 110, 140, 150, such that the second substrate comprises a temporary first outer surface. At least a portion of the protective second substrate from the body bag sheet can be removed to expose the cohesive layer at least along the outer edges. In some embodiments, the entire protective second substrate may be removed. In some embodiments, the protective second substrate may be perforated so that only a portion of the protective second substrate can be removed. In this manner, a body or item can be placed on the remaining portion of the protective second substrate in a middle portion of a sheet to provide an insulative or protective layer between the body and the cohesive layer.

Figure 12A:
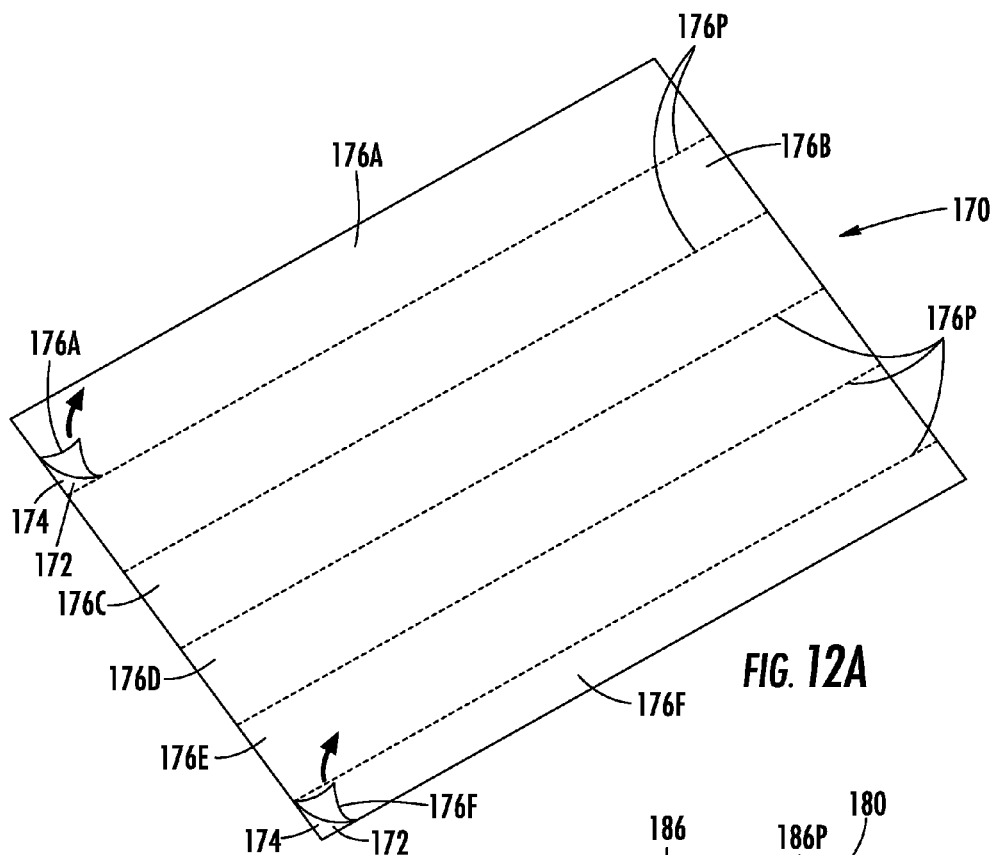
Figure 12B:
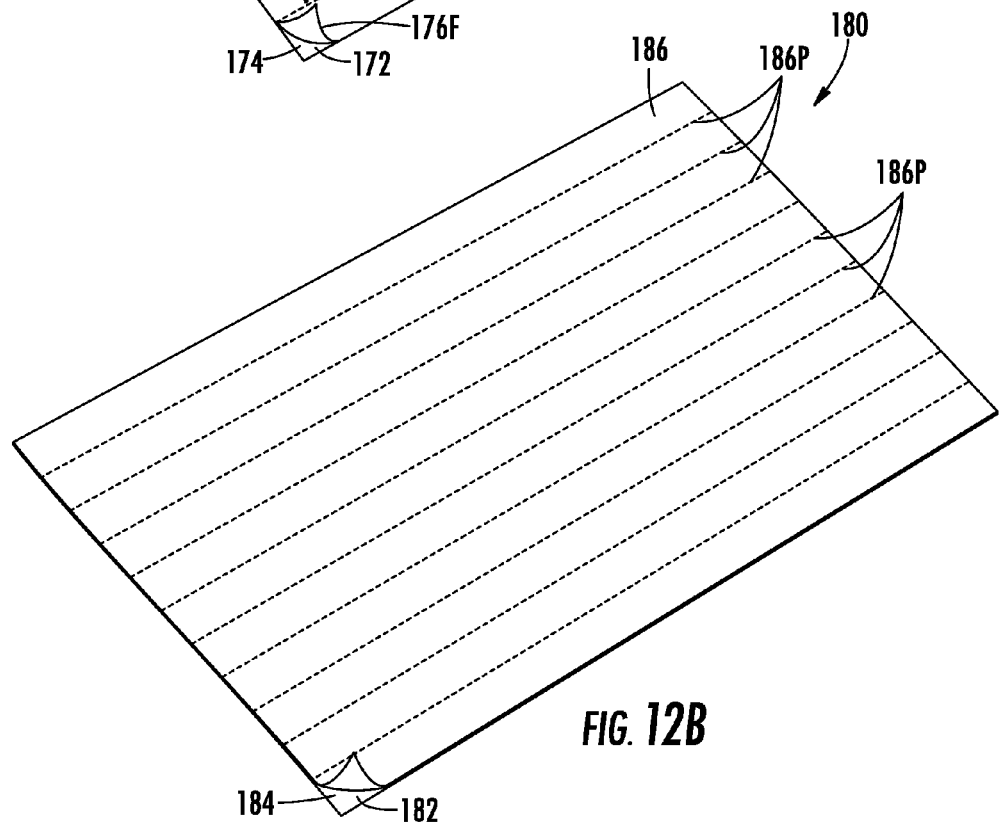

Referring to FIGS. 12A-12C, examples of packaging sheets or body bag sheets are provided to illustrate embodiments that can comprise a removable protective substrate that can have perforations therein to allow the protective substrate to be removed in strips. As shown in FIG. 12A, a packaging sheet generally designated 170, which can be, for example, a body bag sheet, is provided. The packaging sheet 170 can comprise a first substrate 172 having a first surface and an opposing second surface (not shown) and a removal protective second substrate 176. As explained in other examples above, an adhesive layer, which for example can be a pressure sensitive adhesive, can be disposed on the first surface of the first substrate 172. A cohesive layer 174 can be disposed on the pressure-sensitive adhesive layer, such that the cohesive 174 forms a first outer surface of the packaging sheet 170 and the opposing second surface of the first substrate 172 forms a second outer surface (not shown) of the packaging sheet 170. The first substrate 172, the pressure-sensitive adhesive layer, and the cohesive layer 174 of the embodiment shown can comprise, as an example any of the examples provided above with reference to FIGS. 1A and 1B.

The removal protective second substrate 176 can be removably disposed on the cohesive layer 174 that forms the first outer surface of the packaging sheet 170. The removal protective second substrate 176, for instance, can comprise a releasable substrate. In some embodiments, the releasable substrate 176 can comprise a release film or a release paper. In some embodiments, the releasable substrate 176 can comprise a silicon coated release film. The removable protective second substrate 176 can be placed on the cohesive layer 174 to prevent accidental contact between the portions of the cohesive layer 174. The removal protective second substrate 176 can have perforation lines 176P that create multiple strips. For example, the perforation lines 176P can divide the removal protective second substrate 176 into six separately removable strips 176A, 176B, 176C, 176D, 176E, 176F. The perforation lines 176P can run about parallel to each other. The perforation lines 176P can run along the width of the sheet or the length of the sheet For example, perforators can be installed in production lines as shown in FIGS. 3A-3C so that the perforation lines run in the machine direction. The perforation lines can create strips that can be more easily removed from the packaging sheet without causing portions of the first outer surface with the cohesive contacting each other. Splitting the releasable protective layer into multiple strips with the perforation lines can be especially helpful for large packaging sheets such as body bag sheets described above.

Each strip 176A, 176B, 176C, 176D, 176E, 176F can be individually pulled partially or fully from the first substrate to permit any one of or all of the strips 176A, 176B, 176C, 176D, 176E, 176F to provide access to the cohesive layer 174 that resides beneath the strips. As shown in FIG. 12A, for example, strip 176A and strip 176F of the removable protective substrate 176 can be pulled away from the first substrate 172 to expose the cohesive 174 at two outer side edges. To create a package with the single packaging sheet 170, the other strips 176B, 176C, 176D, 176E may also be removed from the first substrate 172 to permit all of the cohesive layer 174 to be exposed so that the packaging sheet can function in a similar manner as the embodiments described in relation to FIGS. 7A-7C and FIGS. 10A-10B. Alternatively, the other strips 176B, 176C, 176D, 176E may be partially pulled upward on the ends and folded inward to expose the cohesive 174 at the two end edges. In this manner, packaging sheet 170 can provide a package that is scalable that can also have an insulative or protective layer that is comprised of the remaining strips 176B, 176C, 176D, 176E with folded end portions.

The number of perforation lines can vary as needed or desired. For example, some embodiments that have a perforated releasable protective substrate can have a single perforation line. In other embodiments, multiple perforation lines can be provided in the releasable protective substrate. For example the number of perforation lines can vary between two and ten or more, depending on the desired use and size of the packaging sheet. FIG. 12B shows a similar embodiment of a packaging sheet generally designated 180 that can comprise a first substrate 182 having a first surface and an opposing second surface (not shown) and a removal protective second substrate 186. As explained in other examples above, an adhesive layer can be disposed on the first surface of the first substrate 182 with a cohesive layer 184 disposed on the adhesive layer. The removable protective second substrate 186 can have multiple perforation lines 186P that divide the removal protective second substrate 186 into six separately removable strips, in the particular embodiment shown, ten perforation lines 186P are provided in the releasable protective substrate 186 to divide the releasable protective substrate 186 into eleven strips.

FIG. 12C represents a further embodiment of a packaging sheet generally designated 190. As above, the packaging sheet 190 can comprise a first substrate 192 having a first surface and an opposing second surface (not shown) and a removal protective second substrate 196. As explained in other examples above, an adhesive layer, which for example can be a pressure sensitive adhesive, can be disposed on the first surface of the first substrate 192 with a cohesive layer 194 disposed on the pressure-sensitive adhesive layer. The removable protective second substrate 196 can have longitudinal perforation lines 200 and 202 proximal to the outer side edges of the packaging sheet 190 and latitudinal fold lines or perforation lines 204 and 206 proximal the outer end edges of the packaging sheet 190. Strips 196A and 196B of the removal protective second substrate 196 along the outer side edges of the packaging sheet 190 can be pulled away from the first substrate 192 and the cohesive layer 194 and the strips 196C and 196D along the outer end edges of the packaging sheet 190 can be pulled upward and folded inward toward the middle of the packaging sheet 190 or removed from the first substrate 192 and the cohesive layer 194. In this manner, an insulative middle portion 198 of the removal protective second substrate 196 is left intact to provided extra protection to the item or bodily remains placed thereon and sealed within a package formed by folding the single packaging sheet 190 or by attaching another packaging sheet 190 thereto as described above.

In some embodiments, the perforation lines can form a pattern on the removal protective second substrate, such as a circle, oval, square, rectangle, or the like, that allows an outer portion along the perforation lines to be removed in a single piece.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A packaging sheet comprising:
    a first substrate having a first surface and an opposing second surface;
    an adhesive layer applied on the first surface of the first substrate;
    a cohesive layer applied on the adhesive layer, such that the cohesive forms a first outer surface of the packaging sheet with the opposing second surface of the first substrate forming a second outer surface; and
    a protective second substrate removably disposed on the cohesive layer that forms the first outer surface of the packaging sheet, such that the second substrate comprises a temporary first outer surface.

2. The packaging sheet according to claim 1, wherein the first substrate comprises a polymeric film.

3. The packaging sheet according to claim 2, wherein the first substrate comprises at least one of a polypropylene film, a polyethylene film, a nylon film, or a polyester film.

4. The packaging sheet according to claim 1, wherein the second substrate comprises a releasable substrate.

5. The packaging sheet according to claim 4, wherein the second substrate comprises a releasable film.

6. The packaging sheet according to claim 4, wherein the second substrate comprises a perforation lines therein to facilitate removal of the releasable second substrate.

7. A packaging material comprising:
    one or more sealable packaging sheets, each sheet comprising:
        a first substrate having a first surface and an opposing second surface;
        an adhesive layer disposed on the first surface of the first substrate; and
        a cohesive layer disposed on the adhesive layer, such that the adhesive is positioned mainly between the first surface of the first substrate and the cohesive and the cohesive forms a first outer surface of the packaging sheet and the opposing second surface of the first substrate forms a second outer surface; and
        a protective second substrate removably disposed on the cohesive layer that forms the first outer surface of the packaging sheet, such that the second substrate comprises a temporary first outer surface.

8. The packaging material according to claim 7, wherein the second substrate comprises a releasable film.

9. The packaging material according to claim 7, wherein the one or more sheets comprise a roll of packaging material separable into individual sheets.

10. The packaging material according to claim 9, wherein the roll of packaging material comprises a continuous sheet that is capable of being cut into different lengths to form packages of different sizes.

11. The packaging material according to claim 9, wherein the roll of packaging material comprises a continuous sheet having perforations at multiple positions along its length, the continuous sheet being tearable along the perforations to form individual sheets.

12. The packaging material according to claim 9, wherein the one or more sheets are folded so that the releasable protective second substrate of each sheet faces itself upon folding before the one or more sheets are rolled into the roll of packaging material.

13. The packaging material according to claim 7, wherein the one or more sheets comprise individual sheets that are folded into individual units.

14. The packaging material according to claims 13, wherein the one or more sheets are folded so that the releasable protective second substrate of each sheet faces itself upon folding.

15. The packaging material according to claims 13, wherein the one or more sheets are folded so that the releasable protective second substrate of each sheet that forms a temporary first outer surface faces the opposing second outer surface formed by the second surface of the first substrate.

16. The packaging material according to claims 13, wherein multiple units of the folded sheets are packaged together.

* * * * *